Figure 1:
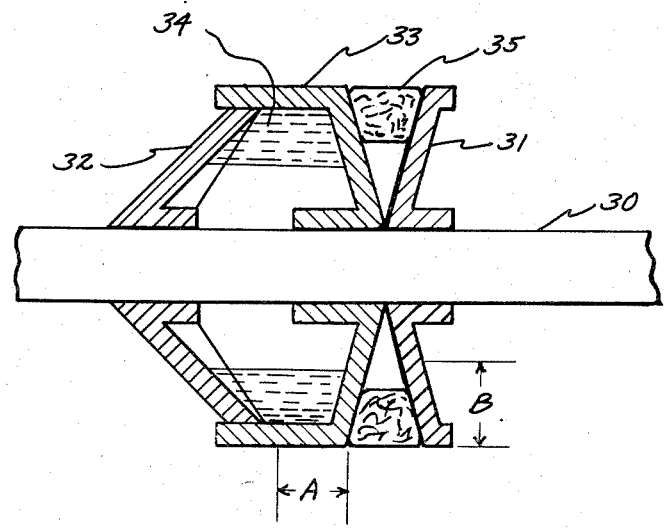

Aug. 13, 1957  W. S. HOOVER ET AL  2,802,367
PULLEY

Filed April 8, 1953  2 Sheets-Sheet 1

WALTER S. HOOVER
BROCK A. SOMERS
INVENTORS

BY David B. Peck
Agent

WALTER S. HOOVER
BROCK A. SOMERS
INVENTORS

BY David B. Pech
Agent

United States Patent Office 2,802,367
Patented Aug. 13, 1957

2,802,367
PULLEY

Walter S. Hoover, Williamstown, Mass., and Brock A. Somers, Simsbury, Conn., assignors, by direct and mesne assignments, to Hoover Transmission Company, Inc., Williamstown, Mass., a corporation of Massachusetts Application April 8, 1953, Serial No. 347,588

4 Claims. (Cl. 74—230.17)

This invention relates to improved belt and pulley drive mechanisms and more particularly refers to an improved constant horsepower pulley and automatic clutch particularly suited for high speed electric motors, internal combustion engines, and gas and steam turbines and the like.

In the past the use of high speed electric motors as power sources for machinery, tools and the like has been widespread. Most motors and in particular the smaller and less expensive types operate at a single speed with moderate efficiency. When overloads occur and the speed drops, severe damage to and even failure of the motor may occur. Starting of the motor, when it is directly connected by means of a pulley, to a machine device, also offers something of a problem, particularly when the moment of inertia of the machine driven is high. In order to compensate for the latter difficulty, it is often necessary to install a manually operated or other type clutch such that the motor is connected to the driven apparatus only after attainment of normal operating speed. Even so, the problem is unsolved since the high moment of inertia of the apparatus to be driven will cause overload conditions in the motor when the clutch is engaged. As a result of these two factors, it has been common practice and unfortunately an expensive one to employ much larger motors than actually required for normal operation of the machine.

Some proposals have been suggested for varying the driving pulley diameter, as, for example, in United States Patent No. 2,153,151, issued April 4, 1939, to Frank Morella. Here a manually operated pulley member is moved in and out along the shaft axis in order to vary the depth to which the belt engages, thus varying the belt speed. Such a mechanism, while operable by careful manual dexterity, is ineffective for precise and automatic control.

Another system suggested which could have utility involves the use of a heavily spring loaded pulley member in which high belt loads would effect a reduction in the effective pulley diameter. This, however, is unsatisfactory as regards reliability of operation and further suffers from the defect of ineffective operation during the starting period.

It is an object of this present invention to overcome the foregoing and related disadvantages. A further object is to produce a V-belt and pulley driving system which will provide substantially full horsepower output over a wide range of torques. An additional object is to produce an automatic clutch arrangement for high constant speed motors required to provide starting and overload torques substantially higher than normal operating torque. Additional objects will become apparent from the following description and claims.

These objects are attained in accordance with the present invention by a V-belt drive pulley system comprising two adjacent pulley members surrounding and keyed parallel to a drive shaft. The inner radial surfaces of said pulley members form a V-angle sheave with one another, one of said members being axially fixed on said drive shaft, and the second of said members being capable of axial movement along said shaft.

In another of its embodiments, the invention is concerned with a dual V-belt drive system comprising a circular shaft on which are mounted three belt engaging flanges or members, each flange being keyed parallel to said shaft and the center flange being axially fixed thereto. The inner surfaces of the outer flanges for dual V-belt sheaves with the inner flange, in this case.

Our invention is based upon a discovery that a very smooth, automatic and dependable constant horsepower variable torque drive can be produced by novel application of a flowable medium in an enclosed housing element. By use of a flowable medium, we are able to control and make use of high lateral forces which produce a variation in the separation between two flanges of a V-belt sheave thus in turn varying the diameter of the pulley and the torque transmitted. Our invention is particularly applicable to constant speed motors and other power supplying devices but it is not necessarily limited thereto.

Figure 2:
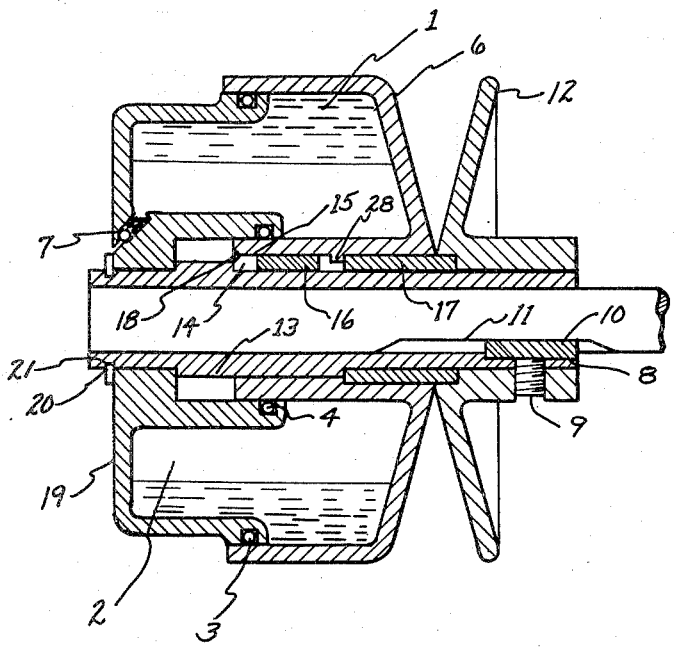
Figure 3:
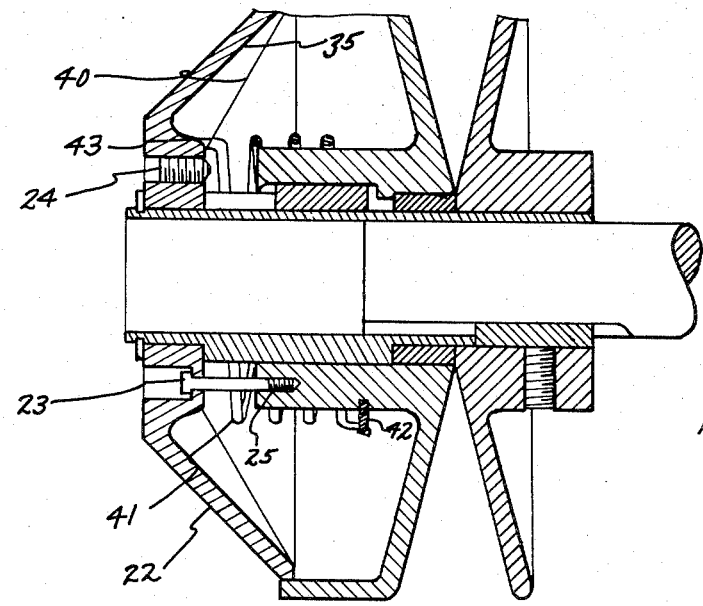
Figure 4:
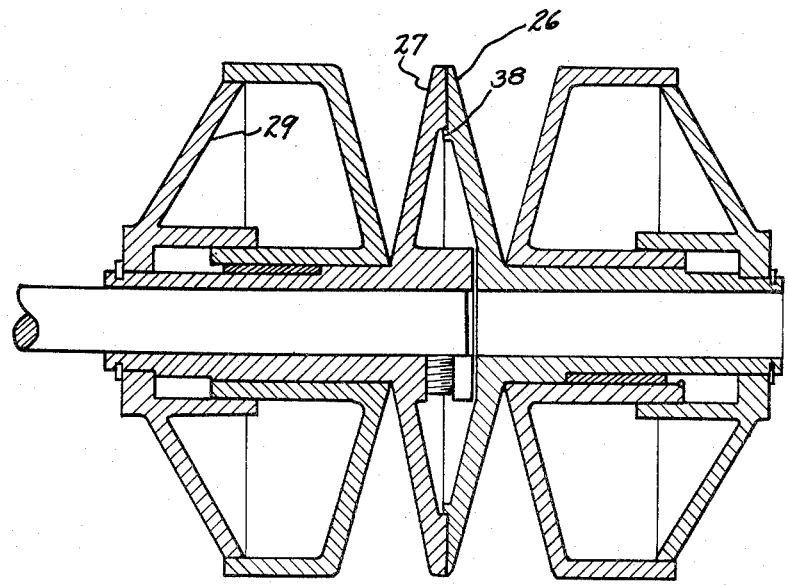

Reference will be made to the appended drawings in which:

Figure 1 is a simplified cross sectional view of the pulley mechanism of our invention, Figure 2 is a detailed cross sectional view of the basic drive system, Figure 3 is a detailed cross sectional view of a typical single V-belt pulley system and Figure 4 is a detailed cross sectional view of a dual V-belt drive system.

Referring more specifically to Figure 1, a simplified representation of our invention is shown. 30 represents the driving shaft from a motor or similar power source. 31 is a fixed pulley member keyed to shaft 30 and forming on its inner side an appropriate inclined surface for the pulley friction drive. 33 is the other pulley member and is keyed to shaft 30 in a manner such as to permit axial travel, as indicated by the letter A. Fixed channel member 32 is keyed to shaft 30 and forms a closed housing with movable pulley member 33. Within the closed housing thus formed is contained medium 34, shown in its position during high speed of the driving shaft. Flowable medium 34 is forced to the inner peripheral surface of the housing by the centrifugal force acting as a result of the rotation of the driving shaft. The pressure of the medium 34 on the outer regions of the housing and particularly the pressure against axially movable pulley member 33, moves the latter towards pulley member 31. Thus the pulley diameter increases, forcing belt 35 outwardly an amount determined by the speed of the shaft 30 and the amount of the load. The operation and advantages of the variable torque pulley of our invention can be summarized as follows:

1. *Starting*

When the shaft is not in motion, the flowable medium 34 is at the bottom of the housing, and the belt 35 rests freely on the pulley members 31 and 33. Normally the pulley diameter will be at a minimum and belt 35 will be preferably running on a free shaft bearing.

When the motor is started the centrifugal force begins to act upon the flowable medium 34, thus exerting pressure on pulley member 33. But, since the pulley diameter is still relatively small, a high torque is transmitted by the belt, thus greatly facilitating the starting of high inertia loads such as saws, planers, punch presses, etc. However, the separation between the pulley members will be lessened thereby increasing the pulley diameter as the load on the belt is decreased.

It can be seen that this starting action permits the motor to reach rated speed rapidly without overload and yet provides a high useful torque during starting.

2. Normal operating

With the starting inertia of the driven device overcome, the frictional load on the pulley members from belt 35 is reduced and the centrifugal pressure on movable pulley member 33 from medium 34 is sufficient to drive the pulley member towards fixed pulley member 31, increasing the pulley diameter and forcing belt 35 further away from shaft 30. Under normal operating conditions without major load fluctuations, the pulley diameter and belt speed will remain substantially constant.

3. Overload conditions

Due to the predictable and uniform force acting on movable pulley member 33 from flowable medium 34, the load on the motor can be controlled closely. If an overload occurs due to any one of the numerous reasons therefor, the belt 35 will automatically and smoothly act on a reduced pulley diameter, thus providing increased torque, without change in speed of the driving device. If the load becomes even greater, the pulley diameter will be reduced to the minimum and the belt will be free running until the overload is eliminated.

The advantages noted above and/or later described in detail can be listed as:

(a) Automatic clutching for starting.
(b) Automatic full driving speed attainment before load application.
(c) Automatic high torque starting.
(d) Automatic overload protection.
(e) Wide effective pulley diameter ratios.
(f) Absence of hunting, vibration and other unbalance effects.
(g) Easily adjusted maximum and minimum pulley diameters.
(h) Adaptability to dual sheave pulley systems.

Referring more specifically to Figure 2, the principle of operation is clearly shown, the flowable medium being indicated as 1. The medium is contained in a housing formed by sheave flange element or pulley member 6, in sliding engagement with fixed cup member 19, there being an O-ring seal 3 provided to prevent leakage of medium 1. Drive shaft tube 8 is fitted over the standard shaft of an electric motor or other power source and secured by Allen or other suitable screws 9. Each of these latter screws is tightened against standard key 10 which converts the drive of the motor shaft with standard key way slot 11. The fixed pulley member 12 is thus secured to shaft tube 8, and is disposed in a fixed position angularly and also axially with respect to the shaft. Shaft tube 8 is provided with an enlarged central portion indicated as 13 having a groove 14 matching a similar groove 15 in the variable pulley member 6 into which an anti-friction key 16 is placed to reduce friction during movement of pulley member 6.

Between the fixed pulley member and the shaft sleeve 8 there is located a powered bearing 17 so that when the governor V-pulley is declutched and not transmitting horsepower, the V-belt is at rest upon the bearing with the pulley spinning. It is to be understood that bearing 17 is not as essential with an electric motor as with a gasoline motor having a normally variable speed.

Further explanation of the drawing is best made by describing a typical method of assembly.

The shaft sleeve 8 is held in place and a powered or other bearing 17 is inserted over the shaft sleeve until the bearing thrusts against a shoulder of the enlarged central portion 13. The fixed pulley member 12 is then fitted over shaft sleeve 8 until it thrusts against bearing 17. The Allen or other adjusting screw 9 is then screwed in sufficiently to lock pulley half 12 to sleeve 8. This is followed by insertion of variable pulley member 6 part way over shaft sleeve 8 and insertion of anti-friction rod 16 into grooves 14 and 15, thus anti-frictionally locking member 6 to shaft sleeve 8 so that rotational movement may be imparted to both pulley members. Thereafter, the edge 18 of the metal may be peened down or solder applied into channel 15 to prevent working out of the anti-friction rod 16. The other end of key channel 15 contains an abutment 28 left by the jig drilling operation to prevent excessive movement of rod 16 at this end.

These operations are followed by careful measurement and introduction of a flowable medium such as ball shot, the amount being determined by the particular application and conditions, into the displacement cavity 1 of the variable pulley member housing; subsequently, fixed cup housing end 19 being inserted to seat against the shoulder of shaft sleeve 8, and being locked in position by the insertion of snap lock ring 20 into groove 21. The pulley governor assembly is now ready for installation on the prime mover.

With reference to Figure 3, there is illustrated a preferred version of the pulley assembly shown in Figure 2. This design is specifically suited to the use of a revolving shot column as the energizing flowable medium. Despite our initial concern regarding the use of ball shot of relatively small diameters in place of a liquid such as a heavy halogenated oil, mercury, mineral oil, etc., exhaustive experimental studies have proved that bunching, unbalanced dynamic vibration, etc., do not occur and that the ball shot flowable medium is completely satisfactory. In addition it possesses advantages over some liquid centrifugal energizing mediums in that no O-ring or similar seals are required, in that accurate weight measurements can be made more readily, in that lower cost manufacture is permitted and in that ambient temperature has no effect on performance.

Further the ball shot column can be contained in different housing contours to obtain different desired centrifugal force effects and column heights to produce lateral force on the variable pulley member in the transmission of horsepower by a V-belt drive over a wide torque range.

The assembly and all parts shown in Figure 3 are interchangeable essentially with those shown in Figure 2 with the exception of ball shot cup 22. In addition, advantages are obtained in this design with the adjustable maximum and minimum pitch diameter limiting screws indicated as 23 and 24. A drilled through lead permits the use of an Allen wrench for the adjustment of limiting screw 23. It will be noted that the ball shot retaining cup 22 is designed and contoured with a 45° angle with respect to the axis of the shaft on the centrifugal ball shot surface 35. Other angles however can be used according to special design requirements, as for example, a 30° angle where a small flowable medium quantity will result in relatively great column heights and thus in a relatively large force against the movable V-belt pulley member.

Adjusting screw 24 limits the minimum pitch diameter of the automatic governor function of the pulley. Adjustment of screw 23 is permitted by drilled lead 25, for preselecting maximum pitch diameter.

Diffuser vane 40 forms part of the fixed housing member 22. Normally four such vanes are included when the member is formed. These vanes assist in creating initial turbulence and movement of the flowable medium.

Tension spring 41 may be incorporated between tie point 43 on housing 22 and tie point 42 in the sliding pulley member in order to create a forced return to the no-load starting position of the sheave. Thus when the motor is started up, the effective pulley diameter will be at its minimum value, and if the minimum is appropriately selected by means of adjusting screw 24, the belt will ride on the free-running bearing. The tensional pull of the spring is, of course, always susbtantially less than the counter-acting force of the revolving flowable medium.

In all cases, of course, a suitable pulley diameter maximum and minimum setting, based on desired maximum efficiency motor operational speed, belt size etc., can be established.

With reference to Figure 4, a dual pulley suitable for operation with various types of standardized V-belts is shown. Here all components are interchangeable with the single V-belt pulleys of Figure 3 with the exception of fixed pulley members 26 and 27, both of which have the shaft sleeves as integral parts thereof. It is important to observe that accuracy of concentricity of manufacture and service can be maintained by machine pilot 38. It is noted that since the fixed pulley members 26 and 27 have integral shaft sleeves, assembly of bearing 17 of Figure 2 would not be possible. Thus bearing 17 is omitted in Figure 4 and is of course not essential for electric motor operation.

In this figure the revolving shot pressure angles have been reduced to 30° as previously discussed to permit a smaller amount of ball shot to be utilized with the same diameters of variable pulley member and fixed pulley member.

The nature of the flowable medium has been discussed in connection with the drawings but it is to be understood that ball shot normally of a diameter of less than about ⅛″ is defined herein as a flowable medium as well as such materials as hydrocarbon oils, halogenated oils, such as perfluoro kerosene, mercury, chlorinated diphenyl, etc., or other oils loaded with heavy particles and the like.

The materials of construction for the other elements of the pulley assembly may be any desired, such as steel, die casting, brass, aluminum, plastic and the like. The bearing elements may actually be ball bearing types and the antifriction rod may be replaced by antifriction ball bearings.

Our invention is in no way limited to use with any particular size motor or pulley and is indeed only limited by the belt characteristics. When gasoline engines and similar variable speed power sources are employed, the use of a free running bearing between the pulley members is most desirable.

It may be seen that the invention thus may be defined as a variable diameter pulley system comprising one pulley member fixed on a shaft and rotatable therewith, and a cooperating laterally slidable pulley member, the position of the slidable pulley member being responsive to the rotational speed of said shaft such that as the shaft's speed increases, the slidable pulley member is subjected to increased lateral forces towards said fixed member; and being responsive to the load such that, as the load increases, at constant shaft speed, the slidable pulley member exerts increasing force towards said fixed member as it moves away from said fixed member. In the preferred embodiment, the means for accomplishing this speed and torque responsive action is a revolving flowable medium which exerts a force against the slidable pulley member which is a direct function of the rotational speed of the shaft, and, at constant speed, varies inversely with the effective pulley diameter and directly with the distance between the relatively movable pulley members.

What is claimed is:

1. A V-belt drive assembly comprising a driving shaft, a pair of opposed pulley members mounted on said shaft to form a V-pulley, a housing member concentrically and rotatably mounted about said shaft on one side of the pulley member adjacent thereto, at least one of said housing and adjacent pulley members having an axially extending wall, said housing member having a radially extending wall fixed axially with respect to said shaft, said adjacent pulley member having a radially extending wall opposed to said housing radially extending wall and movable axially relative to said housing radially extending wall towards and away from the other pulley member, said axially and radially extending walls defining an annular chamber surrounding said shaft, the movement of said adjacent pulley member between said housing radially extending wall and said other pulley member varying the volume of said annular chamber, and a flowable medium having substantially less volume than the maximum volume of said chamber contained, and having freedom of movement in all directions, within said chamber, said medium creating a centrifugal head upon rotation of said housing member exerting pressure against said radially extending walls of said chamber, said medium being redistributed radially in said chamber as said chamber changes volume to vary the column height of said medium and also to vary the areas on both said radially extending walls against which said medium bears according to the position of said adjacent pulley member relative to said housing member, to vary the axial thrust of said adjacent pulley member in the direction of said other pulley member, decreasing said column height and said areas as said adjacent pulley member moves away from said housing member and increasing said column height and said areas as said adjacent pulley member moves toward said housing member, so that, at constant housing rotational speed, the axial thrust tending to resist a decrease in the effective diameter of said pulley will be minimal at maximum effective pulley diameter increasing with increasing load to maximal at the minimum effective pulley diameter.

2. A belt pulley as claimed in claim 1 wherein said flowable medium consists of a mass of substantially spherical balls.

3. A belt pulley as claimed in claim 1 wherein said housing is fixedly mounted on said shaft for rotation therewith.

4. A belt pulley as claimed in claim 1 wherein said housing and said one pulley member are fixedly mounted on said shaft for rotation therewith.

References Cited in the file of this patent

UNITED STATES PATENTS

| 2,283,267 | Kohl | May 19, 1942 |
| 2,310,081 | Hill | Feb. 2, 1943 |
| 2,336,973 | Wemp | Dec. 14, 1943 |
| 2,496,201 | Dodge | Jan. 31, 1950 |
| 2,521,457 | Heyer | Sept. 5, 1950 |
| 2,553,505 | Miner | May 15, 1951 |

FOREIGN PATENTS

| 592,141 | Great Britain | Sept. 9, 1947 |